(12) United States Patent
Walker et al.

(10) Patent No.: US 11,654,883 B2
(45) Date of Patent: May 23, 2023

(54) CURRENT BASED ANTI-CHATTER LATCH

(71) Applicant: FORD GLOBAL TECHNOLOGIES, LLC, Dearborn, MI (US)

(72) Inventors: Aaron Walker, Auburn Hills, MI (US); Mateusz Zadrozny, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 17/232,892

(22) Filed: Apr. 16, 2021

(65) Prior Publication Data
US 2022/0332304 A1 Oct. 20, 2022

(51) Int. Cl.
*B60W 20/13* (2016.01)

(52) U.S. Cl.
CPC ....... *B60W 20/13* (2016.01); *B60W 2510/244* (2013.01); *B60W 2710/08* (2013.01); *B60W 2710/248* (2013.01)

(58) Field of Classification Search
CPC ...... B60W 20/00; B60W 20/10; B60W 20/13; B60W 20/15; B60W 1/00; B60K 6/22; B60K 6/26
USPC .......................................................... 701/22
See application file for complete search history.

(56) References Cited

U.S. PATENT DOCUMENTS

| | | | | |
|---|---|---|---|---|
| 3,584,262 A * | 6/1971 | Gary | ..................... | H03K 17/292 327/402 |
| 5,856,711 A * | 1/1999 | Kato | ..................... | H02H 3/087 307/10.6 |
| 8,344,687 B2 | 1/2013 | Nishikawa et al. | | |
| 10,707,788 B2 | 7/2020 | Ansbacher et al. | | |
| 2006/0198171 A1 * | 9/2006 | Samodell | ................. | H02M 1/10 363/41 |
| 2007/0115604 A1 * | 5/2007 | Zettel | ................... | H01H 47/002 361/160 |
| 2008/0025058 A1 * | 1/2008 | Gerber | ...................... | H02J 3/44 361/85 |
| 2009/0038864 A1 * | 2/2009 | Yun | ........................... | B62B 3/12 180/19.1 |
| 2012/0035801 A1 * | 2/2012 | Browne | ............... | B62D 5/0487 324/418 |
| 2014/0002093 A1 * | 1/2014 | Elliott | ................ | G01R 31/3278 324/423 |
| 2014/0229066 A1 * | 8/2014 | Harada | ................ | B62D 5/0481 701/41 |
| 2018/0290552 A1 * | 10/2018 | Chen | ....................... | B60L 1/00 |
| 2020/0079222 A1 | 3/2020 | Tabatowski-Bush et al. | | |

FOREIGN PATENT DOCUMENTS

| | | | | |
|---|---|---|---|---|
| JP | 5317188 B2 | 9/2010 | | |
| WO | WO-9515436 A1 * | 6/1995 | ......... | F02N 11/0851 |
| WO | WO-0079664 A1 * | 12/2000 | ............ | H02H 3/025 |

* cited by examiner

*Primary Examiner* — Joseph J Dallo
(74) *Attorney, Agent, or Firm* — David B. Kelley; Brooks Kushman P.C.

(57) ABSTRACT

A vehicle includes a traction battery, an electric machine, a relay electrically between the traction battery and electric machine, and a controller. When closed, the relay completes an electrical circuit including the traction battery and electric machine. The controller selectively commands the relay to open based on a voltage across a coil of the relay and a current through the coil.

12 Claims, 4 Drawing Sheets

CURRENT BASED ANTI-CHATTER LATCH

TECHNICAL FIELD

This disclosure relates to the operation of automotive power systems.

BACKGROUND

Electrically powered vehicles may use relays to selectively transmit electricity to power components therein. The relays may be configured to open upon detection of a loss of voltage. In some cases, the loss of voltage may be due to vibration and other external sources.

SUMMARY

An automotive power system includes a relay including a coil, and a controller. The controller commands the relay to open after a voltage across a coil of the relay remains less than a voltage threshold for at least a predetermined period of time and a current through the coil is less than a current threshold following the predetermined period of time.

A vehicle includes a traction battery, an electric machine, a relay electrically between the traction battery and electric machine, and including a coil, and a controller. The controller commands the relay to open based on a current through the coil.

A method includes commanding a relay to open based on a voltage across a coil of the relay and a current through the coil.

A vehicle includes a traction battery selectively in electrical communication via a relay with a vehicle load. The vehicle further comprises a current sensor disposed sequential with the traction battery and the vehicle load. Even further, the vehicle comprises a controller. The controller receives a signal from the current sensor indicative of a current value of the power network, determines a first dynamic electrical current differential value, compares the first dynamic electrical current differential value to a predetermined electrical current differential value. The controller, in response to the first dynamic electrical current differential value being greater than the predetermined electrical current differential value, actuates the relay such that electrical communication between the traction battery and the vehicle load is inhibited.

DETAILED DESCRIPTION

Figure 1:
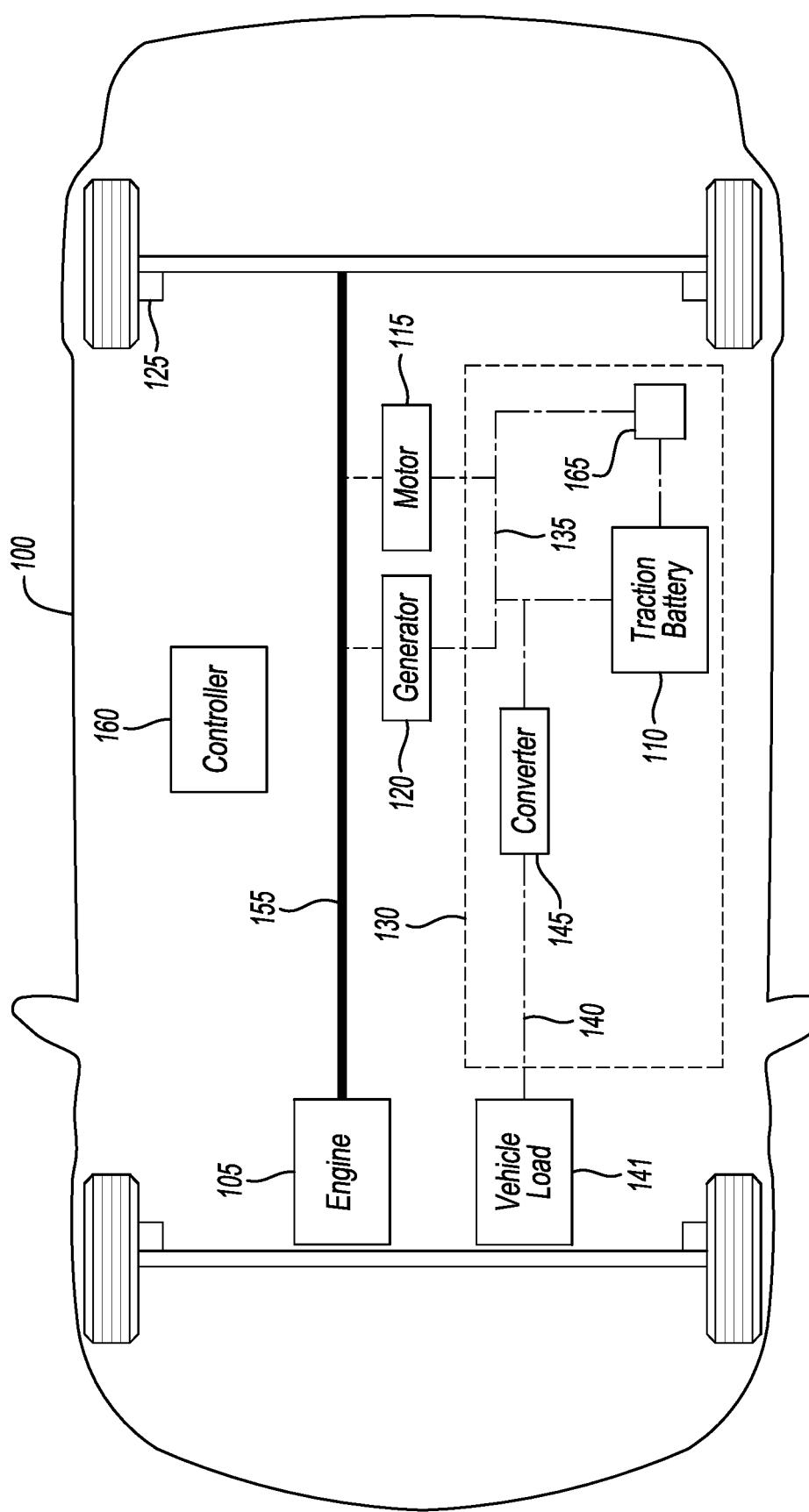
FIG. 1 illustrates a vehicle.

Disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art. Moreover, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In intermittent cases, a relay may experience issues due to rapidly changing electrical events. A loss of voltage, for example, may inaccurately signal the relay to open. This is due in part to the inductive nature of the relay. A determination of certain electrical current parameters of the relay's coil may allow for more appropriate opening of the relay. Described herein are strategies to prevent non-requested relay detachments. Before discussing these strategies in detail, a general discussion of an example automotive environment is provided for reference.

An engine may be used to provide torque to a propulsion system within a vehicle. The engine may convert chemical energy from a fuel source into mechanical energy. In particular, the engine may provide mechanical energy in the form of rotational energy exerted upon a crankshaft. The engine may be configured to provide the mechanical energy to a transmission through the crankshaft. The engine may be in communication with a vehicle controller. The engine may include a plurality of sensors. One of the sensors may determine and provide engine parameters to a vehicle controller. For example, an engine sensor may determine and provide engine speed, fuel economy, lubricant level, or other engine parameters.

A vehicle battery maybe used to provide torque to a propulsion system within a vehicle. The vehicle battery may be a traction battery. The vehicle battery may be used to store electrical energy. The vehicle battery may include a plurality of battery cells. In some embodiments, at least two of the battery cells may be in series. In such embodiments, the electrical potential of both of the battery cells may be summed. Alternatively, or additionally, at least two of the battery cells may be in parallel. In such embodiments, the electrical current capacity may be summed. The vehicle battery may have a plurality of sensors. One of the sensors may determine and provide battery parameters to a vehicle controller.

The vehicle battery may serve as a control power source. Additionally, or alternatively, the vehicle may have a secondary battery that may serve as a control power source. The control power source may be lower in voltage and current than a traction battery used for vehicle propulsion. For example, the control power source may provide 24 volts of electrical potential. The control power source may provide electricity having direct current. As such, the control power source may have a positive pole and a negative pole.

The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine. Alternatively, the vehicle may have a clutch between the drivetrain and the internal combustion engine.

The propulsion system may include a regenerative braking system. The regenerative braking system may be in mechanical communication with a plurality of vehicle wheels. The regenerative braking system may be used to convert mechanical energy into electrical energy. For example, the regenerative braking system may be used to convert inertia from braking into electrical energy by using in part, a magnet, to reduce the absolute velocity of a vehicle. Changing magnetic flux may produce an electrical current. The regenerative braking system may be configured to provide the electrical current to an electrical component of the vehicle. For example, the regenerative braking system may be in electrical communication with a vehicle battery, such that the regenerative braking system is configured to produce electricity from inertia gathered from the mechanical communication with the vehicle wheels. Electricity gathered from the regenerative braking system may be converted by the converter such that its electrical parameters are suited for either of high-voltage and low-voltage electrical bus networks.

A generator may be configured to convert mechanical energy into electrical energy. In some embodiments, the generator may be configured to convert mechanical energy from an internal combustion engine into electrical energy for charging a vehicle battery. The generator may also be used to convert mechanical energy from an internal combustion engine into electrical energy for powering a vehicle load.

A motor may be configured to convert electrical energy into mechanical energy. For example, the motor may be configured to receive electrical energy from a vehicle battery to provide mechanical energy to a vehicle drivetrain. Alternatively, the motor may be configured to receive electrical energy from an electrical bus network. As such, the motor may be configured to receive electrical energy from other vehicle components configured to provide electrical energy to the electrical bus network.

A power network may be configured to facilitate the electrical communication between power electronics within the vehicle. The power network may use a plurality of electrical bus networks to facilitate the communication. One of the electrical bus networks may be a high-voltage bus network. The high-voltage bus network may be configured to provide DC electricity to electrical components requiring a high voltage. For example, the high-voltage bus network may be configured to have an electrical potential difference of 500 volts. The high-voltage bus network may be configured to be in direct electrical communication with a vehicle battery. Another of the electrical bus networks may be a low-voltage bus network. The low-voltage bus network may be configured to provide DC electricity to electrical components that require a low voltage. For example, the low-voltage bus network may be configured to have an electrical potential difference of 12 volts. The low-voltage bus network may be in direct electrical communication with a supplementary battery. The power network may also have a converter. The converter may be configured to convert electricity of a first set of electrical parameters into a second set of electrical parameters. For example, the converter may be configured to convert electricity have 500 volts into electricity having 12 volts. The power network may include a common ground. The ground may be configured to act as a source of low electrical potential to facilitate the flow of electrical current. In some embodiments, the high-voltage bus network shares a common ground with the low-voltage bus network. Alternatively, the power network may have a plurality of electrical grounds.

The converter may be configured to alter electricity of a first set of parameters into electricity of a second set of parameters. In one embodiment, the converter may convert high voltage electricity into low voltage electricity. For example, the converter may convert 480 volts into 24 volts. Additionally, or alternatively, the converter may convert electricity having 24 volts into electricity having 480 volts. The converter may be bidirectional regarding direction of conversion. In some embodiments, the converter may be configured to vary its conversion. In such examples, the converter may be configured to change its conversion in response to a command from a controller. For example, the converter may be configured to convert 480 volts into 24 volts in response to a first command from a controller, and further configured to convert 480 volts into 12 volts in response to a second command from the controller.

The power network may have a relay. The relay may be used to separate electrical components within the power network. In one embodiment, the relay may be used to remove electrical communication between the vehicle battery and at least one of the components of the remaining components of the power network.

The relay may have a set of contacts. The set of contacts may be configured to remove the electrical communication between at least two components of the power network. One of the at least two components may be the vehicle battery. The relay may be configured to selectively operate the set of contacts in response to a signal commanding the relay to one of open and close the set of contacts. The set of contacts may serve as a component of a voltage sensor. Alternatively, the set of contacts may be in communication with a voltage sensor. The voltage sensor may be in electrical communication with a coil and a common ground. The voltage sensor may determine the voltage across the coil of the relay. While the contactor is off, the voltage sensor may determine the voltage to generally be 0 volts. While the contactor is on, the voltage sensor may determine the voltage to be generally the voltage of the control power source. This may be the voltage at a positive pole of the control power source.

The relay may have a coil. The coil may be configured to receive electrical energy from the battery to operate the set of contacts. Further, the coil may be configured to receive a signal from a controller commanding the relay to one of open and close the set of contacts. Additionally, or alternatively, the coil may be used solely to monitor electrical current of the power network. In some embodiments, the coil is in electrical communication with the vehicle battery independent from the set of contacts. In such an embodiment, the relay may experience electricity having a first set of parameters, and the set of contacts may experience electricity have a second set of parameters. One of the first and second set of parameters may be 0. The coil may serve as a component of a current sensor. Alternatively, the set of contacts may be in communication with a current sensor. The current sensor may determine the electrical current flow through the coil of the relay. Further, the coil may have a voltage sensor. The voltage sensor may be used to determine the voltage value of the coil. The voltage sensor may be configured to send a signal indicative of the voltage value of the coil to a controller. The relay may have a normally open configuration. As such, the set of contacts of the relay may open when no electrical current is flowing through the coil.

The controller may include a memory system and a processor. The memory system may be configured to store instruction sets such as programs, algorithms, methods, etc. The memory system may be further configured to receive, monitor, and store values presented to the controller. Further, the memory may serve as a database. As such, the memory may create, store, and edit data stored in the database. The database may define a schedule. Alternatively, or additionally, the database may define a plurality of schedules. A schedule may include entries used as reference for operating a device. The processor may be configured to execute instruction sets. The controller may be configured to receive signals indicative of information from external sources including but not limited to sensors, devices, and other controllers. The controller may be configured to receive information by various ways including electrical communication and electrical-magnetic communication. Further, the vehicle may comprise a plurality of controllers.

The controller may be a vehicle controller. As such, the controller may be in communication with an engine, a vehicle battery, a drivetrain, an exhaust system, a generator, and a motor of a vehicle. The controller may further be in communication with braking systems, including a regenerative braking system and a friction braking system. The controller may be configured to retrieve values from each of the components of a vehicle such as engine speed, battery SOC, vehicle torque, exhaust flow, and the conditions of a vehicle power network.

The controller may be configured to determine the electrical power flowing through the relay. In such an embodiment, the controller may receive a signal from the voltage sensor. Additionally, or alternatively, the controller may receive a signal from the current sensor. In alternate embodiments, the controller may receive a signal from one of the voltage sensor and current sensor. The controller may use one of a plurality of algorithms to determine disengagement behavior.

FIG. 1 illustrates a vehicle 100. The vehicle 100 includes an engine 105 a traction battery 110, a motor 115, a generator 120, a drivetrain 155, a regenerative braking system 125, and a power network 130. The engine 105 is in mechanical communication with the drivetrain 155 and acts to provide torque to the drivetrain 155. The vehicle 100 also includes a controller 160. The controller 160 is in configured to selectively operate many of the components of the vehicle. Further, the controller 160 is configured to receive signals from various sensors throughout the vehicle indicative of vehicle metrics, performance, status, among other things. The engine 105 is in mechanical communication with the generator 120. The generator 120 is in electrical communication with the power network 130, such that mechanical energy from the engine 105 is converted by the generator 120 into electrical energy to be provided to the power network 130. The traction battery 110 is in electrical communication with the power network 130 and may be charged by the engine 105 via the power network 130. The regenerative braking system 125 is further in electrical communication with the power network 130. The power network 130 is configured to convert inertia from the vehicle 100 into electrical energy. The regenerative braking system 125 may charge the traction battery 110 via the power network 130 from the converted inertia. The motor 115 is in electrical communication with the power network 130. The motor 115 is configured to fulfill propulsion requests to the vehicle 100 using energy from the traction battery 110 via the power network 130.

The power network 130 includes a high voltage bus network 135, a low voltage bus network 140, a vehicle load 141, a converter 145, and a relay 165. The high voltage bus network 135 is in electrical communication with the traction battery 110. The low voltage bus network 140 is used to fulfill electrical energy requests for the vehicle load 141. Such requests include audio and climate control requests. The high voltage bus network 135 is in electrical communication with the low voltage bus network 140 via the converter 145. In this embodiment, the relay 165 is disposed between the traction battery 110 and the motor 115. The relay 165 is also in electrical communication with the controller 160, and configured to receive signals from the controller 160 indicative of whether to provide or remove the electrical communication between the traction battery 110 and the motor 115.

Figure 2:
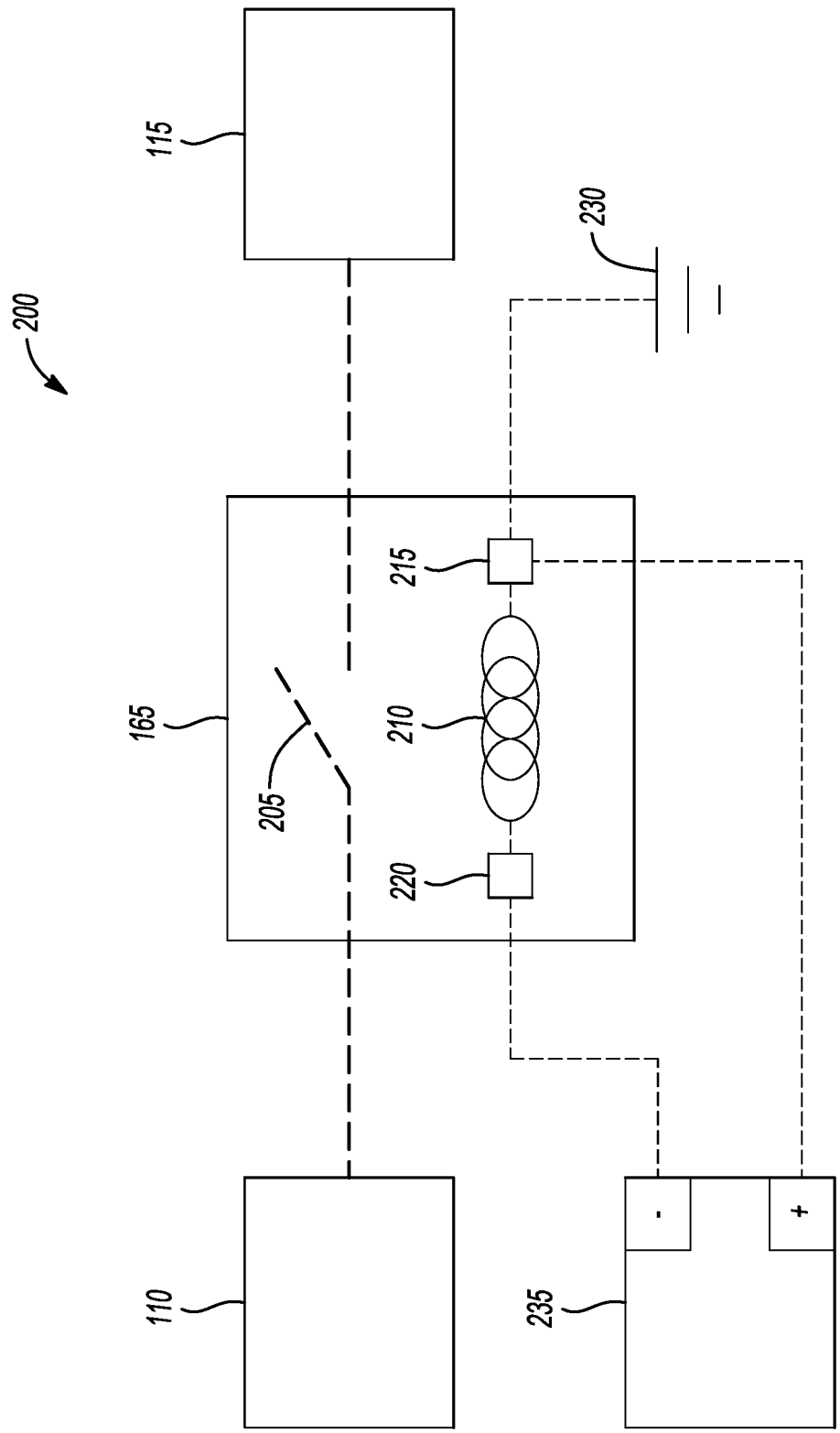
FIG. 2 illustrates a relay circuit layout.

FIG. 2 illustrates a relay circuit layout 200. The relay 165 contains a set of contacts 205 and a coil 210. The set of contacts 205 is configured to selectively actuate to provide the electrical communication between the traction battery 110 and motor 115. The relay circuit layout 200 contains a voltage sensor 215. The voltage sensor 215 is configured to determine the voltage provided by a control power source 235, between the coil 210 and a common ground 230. The control power source 235 may be supplied by the traction battery 110. Alternatively, the control power course 235 may be supplied by a secondary battery. The voltage sensor 215 is further configured to provide the determined voltage value to the controller 160. The coil 210 may be configured to provide magnetic flux to the set of contacts 205 to selectively actuate the set of contacts 205. The coil 210 is connected to a current sensor 220. The current sensor 220 is configured to determine the value of the electrical current flowing thorough the coil 210. The current sensor 220 is further configured to provide the determined electrical current value to the controller 160.

Figure 3:
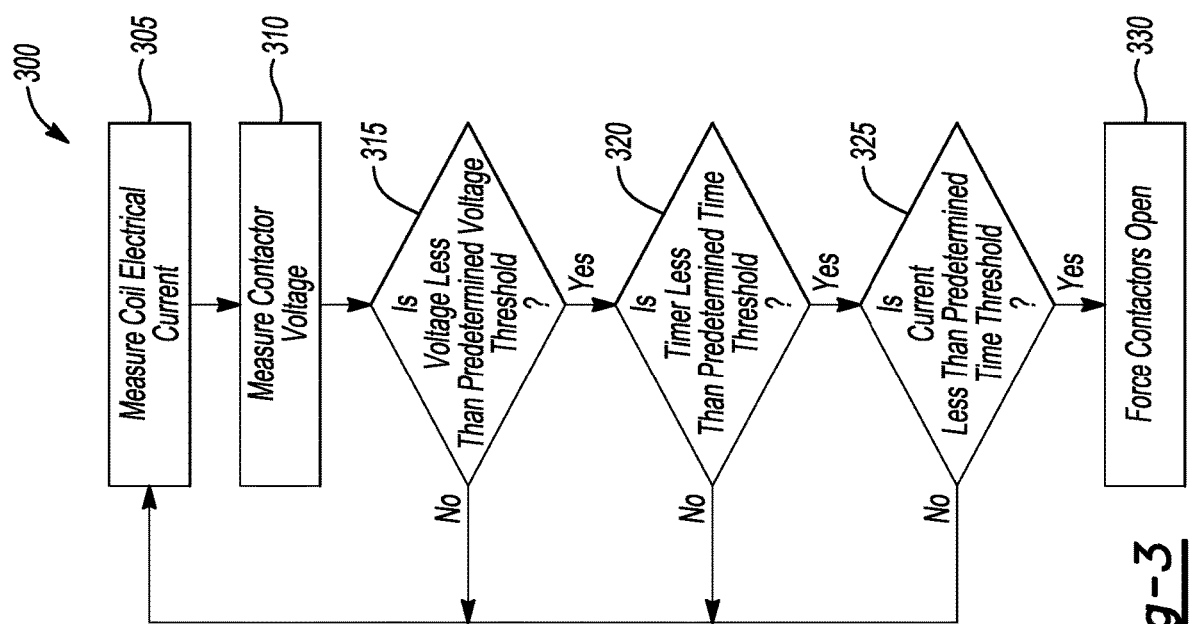
FIG. 3 illustrates a first disengagement algorithm.

FIG. 3 illustrates a first disengagement algorithm 300. The first disengagement algorithm 300 starts with a measure coil current step 305, in which the current sensor 220 determines and transmits the electrical current value of the coil 210 to the controller 160. The first disengagement algorithm 300 moves to a measure coil voltage step 310, in which the voltage sensor 215 determines and transmits the electrical voltage value of the coil 210 to the controller 160. Next, in the compare coil voltage step 315, the controller 160 compares the electrical voltage value of the coil 210 to a predetermined voltage value (e.g., 2 volts, 5 volts, 10 volts, etc.). If the voltage value is greater than a predetermined voltage value, the first disengagement algorithm 300 will return to the measure coil current step 305 to repeat the routine. If the voltage value is less than the predetermined voltage value, the first disengagement algorithm 300 will move to an increment timer step 320, in which the controller 160 will compare the timer to a predetermined time value (e.g., 5 milliseconds, 10 milliseconds, etc.). If the timer is less than the predetermined time value, the first disengagement algorithm 300 will move to the measure coil current step 305. If the timer is greater than the predetermined time value, the first disengagement algorithm 300 will move to the compare coil current step 325, in which the controller 160 will compare the electrical current value of the coil 210 to a predetermined electrical current value (e.g., 20 milliamps, 50 milliamps, 100 milliamps, etc.). If the electrical current value of the coil 210 is greater than the predetermined electrical current value, the first disengagement algorithm 300 will move back to the measure coil current step 305. In the event that the electrical current value of the coil 210 is less than the predetermined electrical current value, the first disengagement algorithm 300 will move to the force relays open step 330, in which the controller 160 will request the relay 165 to force open the set of contacts 205.

Figure 4:
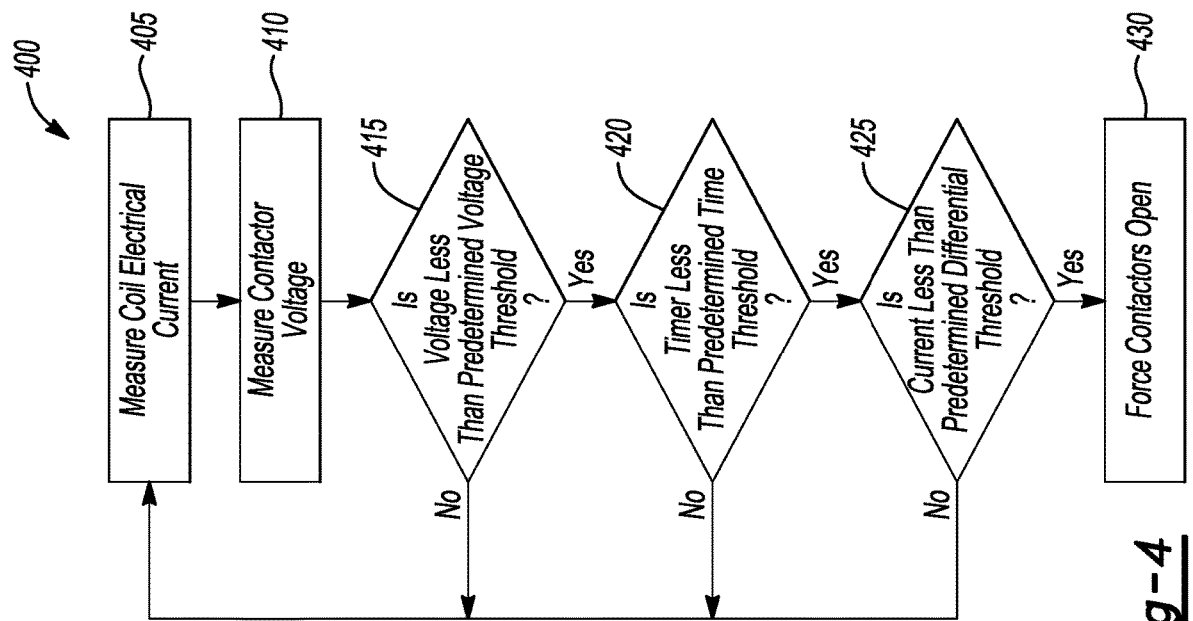
FIG. 4 illustrates a second disengagement algorithm.

FIG. 4 illustrates a second disengagement algorithm 400. The second disengagement algorithm 400 starts with a measure coil current step 405, in which the current sensor 220 determines and transmits the electrical current value of the coil 210 to the controller 160. The second disengagement algorithm 400 moves to a measure coil voltage step 410, in which the voltage sensor 215 determines and transmits the electrical voltage value of the coil 210 to the controller 160.

Next, in the compare coil voltage step 415, the controller 160 compares the electrical voltage value of the coil 210 to a predetermined voltage value. If the voltage value is greater than a predetermined voltage value, the second disengagement algorithm 400 will return to the measure coil current step 405 to repeat the routine. If the voltage value is less than the predetermined voltage value, the second disengagement algorithm 400 will move to an increment timer step 420, in which the controller 160 will compare the timer to a predetermined time value. If the timer is less than the predetermined time value, the second disengagement algorithm 400 will move to the measure coil current step 405. If the timer is greater than the predetermined time value, the second disengagement algorithm 400 will move to the compare coil current differential step 425, in which the controller 160 will compare the electrical current differential value of the coil 210 to a predetermined electrical current differential value. The electrical current differential may be determined instantaneously. In such an embodiment, the contacts of the relay may be forced open immediately upon determining that the differential, the absolute value of change, has risen above a predetermined threshold (e.g., 20 milliamps, 100 milliamps, etc.). The electrical current differential value may be defined by the change in electrical current over time. If the electrical current differential value of the coil 210 is greater than the predetermined electrical current differential value, the second disengagement algorithm 400 will move back to the measure coil current step 405. In the event that the electrical current differential value of the coil 210 is less than the predetermined electrical current differential value, the second disengagement algorithm 400 will move to the force relays open step 430, in which the controller 160 will request the relay 165 to force open the set of contacts 205.

Figure 5:
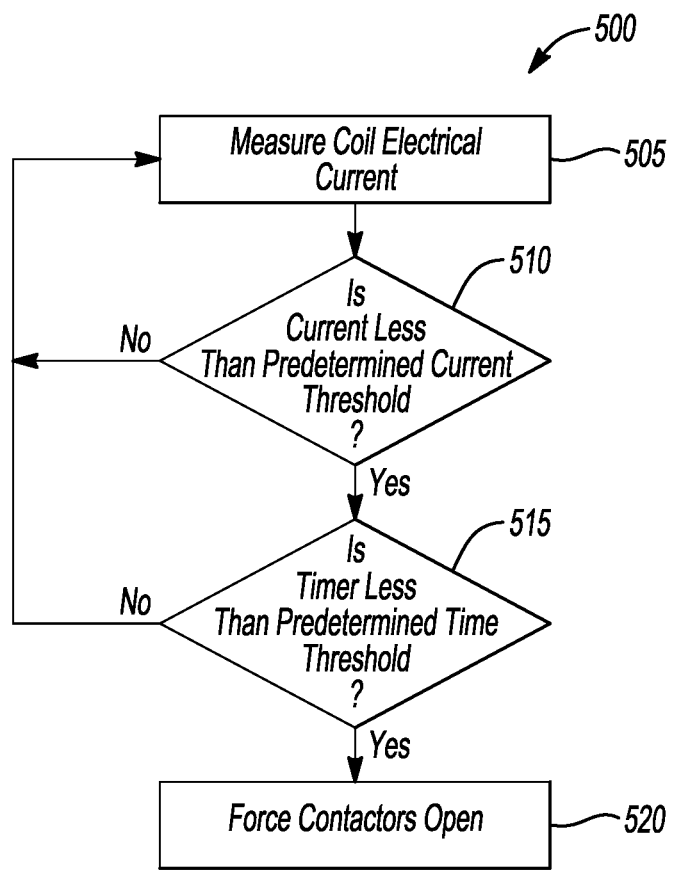
FIG. 5 illustrates a third disengagement algorithm.

FIG. 5 illustrates a third disengagement algorithm 500. The third disengagement algorithm 500 starts with a measure coil current step 505, in which the current sensor 220 determines and transmits the electrical current value of the coil 210 to the controller 160. Next, the controller 160 will compare the electrical current value of the coil 210 to a predetermined electrical current value in the compare coil current step 510. If the electrical current value of the coil 210 is greater than a predetermined electrical current value, the third disengagement algorithm 500 will return to the measure coil current step 505. If the electrical current value is less than the predetermined electrical value, the third disengagement algorithm 500 will move to an increment timer step 515, in which the controller 160 will increment and compare a timer to a predetermined time value. If the timer contains a time value less than the predetermined time value, the third disengagement algorithm 500 will return to the measure coil current step 505 to repeat the routine. If the timer contains a time value greater than the predetermined time value, the third disengagement algorithm 500 will move to a force relays open step 520, in which the controller 160 will request the relay 165 to force open the set of contacts 205.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. Other predetermined or threshold values for example are of course possible, and may be selected via testing, simulation, etc., for a given design. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive power system comprising:
   a relay including a coil; and
   a controller programed to command the relay to open responsive to (i) a measured voltage across the coil remaining less than a voltage threshold for at least a predetermined period of time and (ii) a current through the coil measured after the predetermined period of time being less than a current threshold.

2. The automotive power system of claim 1 further including a traction battery, wherein the relay is electrically connected with the traction battery.

3. The automotive power system of claim 1 further comprising a current sensor arranged to sense the current.

4. The automotive power system of claim 1 further comprising a voltage sensor arranged to sense the voltage.

5. A vehicle comprising:
   a traction battery;
   an electric machine;
   a relay electrically between the traction battery and electric machine, and including a coil; and
   a controller programmed to command the relay to open responsive to (i) a measured voltage across the coil remaining less than a voltage threshold for at least a predetermined period of time and (ii) a change in current through the coil exceeding a change threshold.

6. The vehicle of claim 5 further comprising a sensor arranged to sense the voltage.

7. The vehicle of claim 5 further comprising a sensor arranged to sense the current.

8. A method comprising:
commanding a relay to open based on a measured voltage across a coil of the relay and a measured current through the coil.

9. The method of claim 8, wherein the commanding includes commanding the relay to open responsive to the voltage remaining less than a voltage threshold for at least a predetermined period of time and the current being less than a current threshold following the predetermined period of time.

10. The method of claim 8, wherein the commanding includes commanding the relay to open responsive to the voltage being less than a voltage threshold.

11. The method of claim 8, wherein the commanding includes commanding the relay to open responsive to the voltage remaining less than a voltage threshold for at least a predetermined period of time and a change in the current being greater than a change threshold following the predetermined period of time.

12. The method of claim 8, wherein the commanding includes commanding the relay to open response to the current being less than a current threshold.

* * * * *